United States Patent [19]

Weege

[11] Patent Number: 5,022,476
[45] Date of Patent: Jun. 11, 1991

[54] WHEELCHAIR

[75] Inventor: Rolf-Dieter Weege, Kalletal, Fed. Rep. of Germany

[73] Assignee: Wilhelm Meyer GmbH & Co., K.G., Fed. Rep. of Germany

[21] Appl. No.: 424,597

[22] Filed: Oct. 20, 1989

Related U.S. Application Data

[63] Continuation-in-part of Ser. No. 222,128, Jul. 18, 1988, abandoned.

[51] Int. Cl.$^5$ .......................... A61G 5/04; B62D 5/04
[52] U.S. Cl. .................................. 180/6.5; 180/65.1; 180/79.1; 180/907; 280/304.1
[58] Field of Search ..................... 180/79.1, 65.1, 907, 180/6.5; 280/250.1, 304.1

[56] References Cited

U.S. PATENT DOCUMENTS

| | | | |
|---|---|---|---|
| 4,059,786 | 11/1977 | Jones et al. | 180/907 |
| 4,157,123 | 6/1979 | Rodaway | 180/907 |
| 4,341,278 | 7/1982 | Meyer | 180/907 |
| 4,387,325 | 6/1983 | Klimo | 180/907 |
| 4,483,405 | 11/1984 | Noda et al. | 180/907 |
| 4,634,941 | 1/1987 | Klimo | 180/907 |
| 4,667,136 | 5/1987 | Bell | 180/907 |
| 4,805,712 | 2/1989 | Singleton | 280/250.1 |

FOREIGN PATENT DOCUMENTS 63575 5/1983 Japan .................................. 180/907

Primary Examiner—Mitchell J. Hill
Attorney, Agent, or Firm—Allegretti & Witcoff, Ltd.

[57] ABSTRACT

A wheelchair having a pair of electrically driven drive wheels, a pair of power-operated swivel steering wheels which rotate about a vertical steering axis, and a manually-actuated lever. Each steering wheel has its own motor for adjusting the steering angle of the steering wheel. The steering lever connects to a mechanical-electrical steering angle generator which produces an electrical signal which is dependent on the angular position of the steering lever. The signal is fed into an electrical device which controls both steering wheel motors to adjust the steering angle of the steering wheels. The electrical device produces two adjustment signals, one for each wheel, which are inversely proportional to the radius of the turning curve. The steering angle can be set at any angle to up to 360° thereby providing substantial maneuverability for the wheelchair. The steering angles are precisely controlled to satisfy the laws of steering so that a lateral jamming of the steering wheels and increased wear on the tires is avoided.

4 Claims, 4 Drawing Sheets

WHEELCHAIR

This application is a continuation-in-part of Ser. No. 222,128 filed Jul. 18, 1988.

The invention relates to a motorized wheelchair having improved means for controlling the driving and steering wheels during turning.

PRIOR ART

The article "Driving Engineering in Electrical Wheelchairs" (in German) by Rolf-D. Weege, in the journal "Biomedizinische Technik/Biomedical Engineering", Volume 29, Issue 5, May 1984, pages 95–103, discloses a wheelchair of this type in which two electrically-driven drive wheels are positioned in front of two steering wheels connected by a tracking bar, the ends of which engage the steering arms, which arms are located on the rotatably supported steering axes of the steering wheels. On one of the steering axes, there is positioned a steering lever for the adjustment of the steering angle of the steering wheels.

This type of mechanical power steering has several disadvantages. Through the mechanical connection of the steering wheels by a steering rod mechanism, the steering angle, and thus the radius of curve as the chair turns is severly limited. Furthermore, the mechanical connection between the steering wheels by means of a steering rod mechanism prevents the wheels from individually satisfying the laws of steering. This leads, particularly if the traction between the steering wheels and the ground is great, to an axial bracing of the wheels, and, as a result, to a lateral slipping of at least one steering wheel, which increases wear on the tires and the driving power expended. Through the fixed track alignment of the steering wheels, large steering forces result.

THE INVENTION

The object of the invention is to provide a wheelchair of the type described in which the disadvantages of the known wheelchair are avoided, and in which the steering wheels are constructed to provide a wide range of steering angles without jamming laterally and in which increased energy consumption and wear on the tires is thus avoided.

The invention is based on the concept of entirely eliminating the steering rod which locks together the orientation of the steering wheels and, instead, assigning each steering wheel its own steering motor so that each may be swivelled independently of the other. This construction provides the great advantage that the steering or turning-circle angle, i.e., the angle to which each steering wheel is turned during turning, can be at any angle through 360°. The steering wheels can therefore be turned in all directions independently of each other as desired. Through the use of an electrical drive for the adjustment of the steering angles of the steering wheels, it is possible to control the steering motors by means of electrical signals so that the steering angles of the steering wheels always precisely satisfy the laws of steering, and thus avoid lateral jamming of the steering wheels and increased wear on the tires. By "the laws of steering" is meant that the steering wheels are so turned that their axes lie precisely on the radii of curve travelled. The internal-curve wheel therefore has a greater steering orientation than the external steering wheel, and its steering angle is therefore essentially inversely proportional to the radius of the curvature.

The manual steering and control element can be a steering wheel or a steering lever, constructed as a mechanical-electrical steering angle generator and therefore it generates, in dependence on the angular position of the steering wheel or the steering lever, an electrical steering signal. This signal is fed into an electronic device which, following the laws of steering, produces adjustment signals which control the steering motors thereby adjusting the steering angle of each of the steering wheels. The values of the signals are inversely proportional to the radius of the adjusted curve.

The mechanical-electrical steering angle generator can be constructed in any manner desired such as a simple potentiometer, around a rotary field transmitter, an angle coding device, or the like. It is also possible to use the drive lever as a steering angle generator, with which the absolute and relative speed of the drive wheels can be controlled through their drive motors directly in relation to one another. The steering signal can also be generated based upon the difference between the speeds of the respective drive wheels.

On this principle in a chair having two drive wheels, the electrical device producing the steering wheel steering angles must satisfy the following conditions:

$$\alpha = 90° - \arctan\left(\frac{t_v \frac{i+1}{i-1} + t_h}{2 \cdot l}\right) \quad (1)$$

$$\beta = 90° - \arctan\left(\frac{t_v \frac{i+1}{i-1} - t_h}{2 \cdot l}\right) \quad (2)$$

in which:
$\alpha$ = the steering angle of the external steering wheel during turning;
$\beta$ = the steering angle of the internal steering wheel during turning;
$t_h$ = the track width of said steering wheels;
$t_v$ = the track width of said forward drive wheels;
$i = v_i/v_a$;
$v_i$ = the speed of the internal drive wheel during turning;
$v_a$ = the speed of the external drive wheel during turning; and
$l$ = the distance between the axles of the drive and steering wheel.

The electrical device for the generation of the adjustment signals can be an analogue device. The use of a digital, electronic device, such as a simple computer, for example, also is suitable, whereby the values of the individual electrical signals are converted by means of an analogue/digital converter, or may be present in digital form, as is part of the general knowledge of any technician in this area.

Since the steering angle of the steering wheels is set for the steering motors at a specific value, no joining of the steering wheels is necessary in order to stabilize them. In accordance with a further characteristic of the invention, the vertical steering axes thus follow the axles of the steering wheels. It is even possible to use an offset caster in order to maintain a dynamic stabilization, since the steering axes may each lie behind the rotary axes of the steering wheels. In this case, there needs to be additional consideration given to the steering angle errors conditioned thereon in the computer which generates the adjustment signals for the steering motors. This, however, involves a measure which is known to any technician in the field of vehicle construction, and thus requires no special illustration.

THE DRAWINGS

The invention will now be illustrated in further detail by means of the drawings in which.

DETAILED DESCRIPTION

Figure 1:
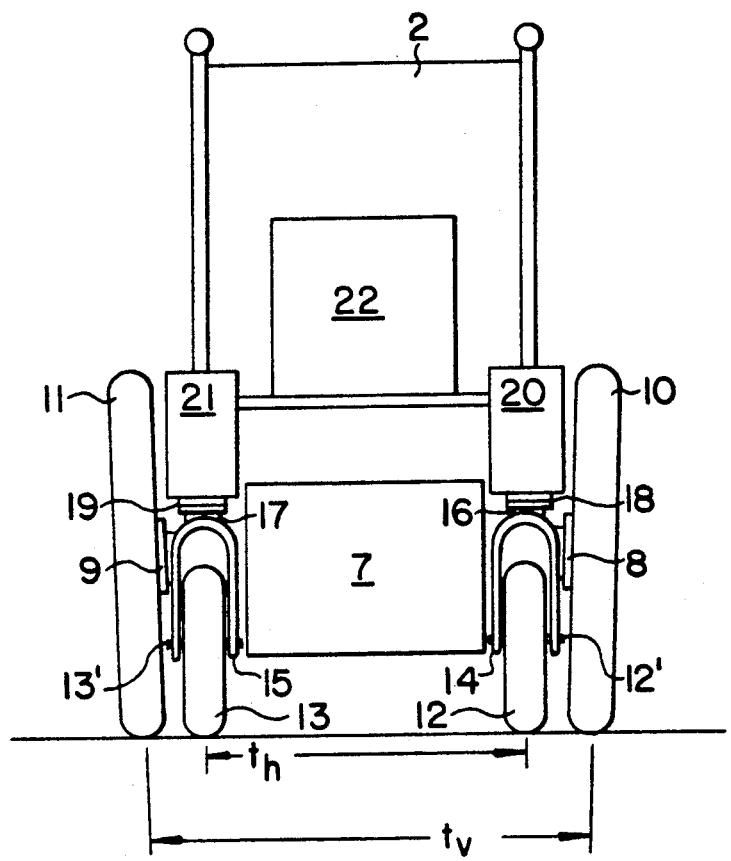
FIG. 1 is a rear view of a wheelchair constructed in accordance with the invention.
Figure 2:
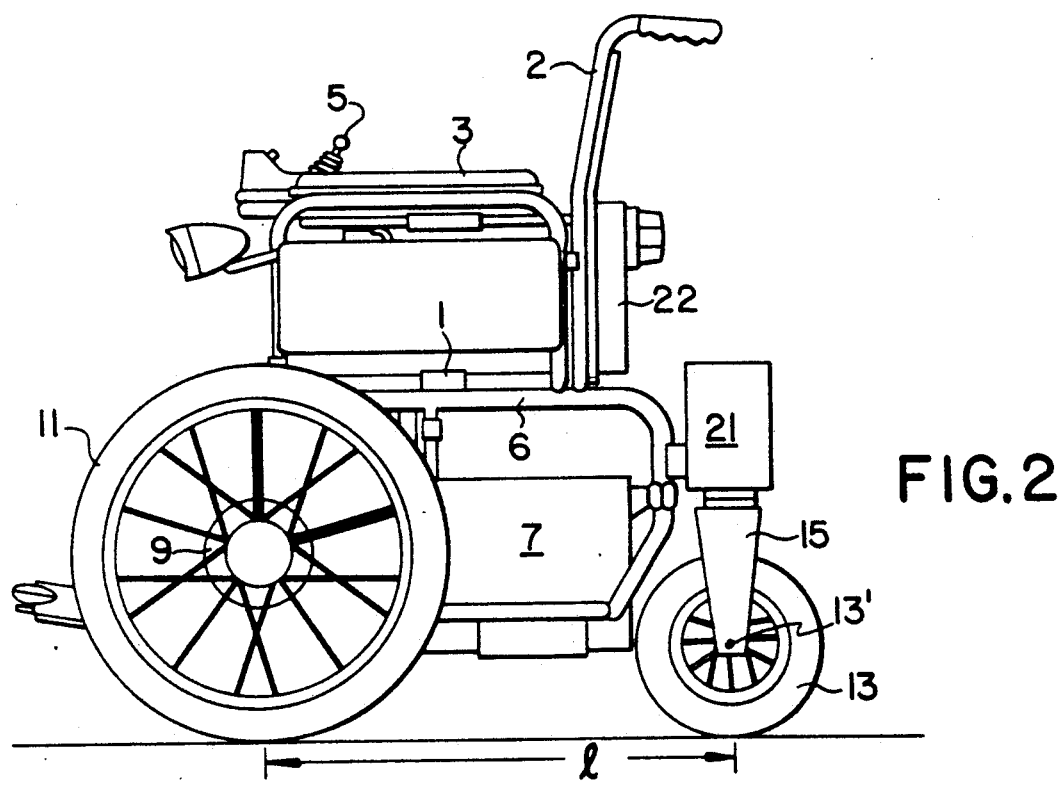
FIG. 2 is a lateral view of the chair shown in FIG. 1.

The wheelchair depicted in FIGS. 1 and 2 has a seat 1, a backrest 2 and armrests 3, one of which has a driving switch box 4 with a control lever 5. A box 7 with a battery is located on the wheel framework. Forward in the direction of travel, two drive motors 8 and 9 with corresponding drive wheels 10 and 11 are attached to the frame 6. Rearwards in the direction of travel, two steering wheels 12 and 13 are mounted on axles 12', 13' journaled in yokes 14, 15. Vertical shafts, providing swivel or rotary axes 16 and 17 are mounted within bearings 18 and 19 above the axles 12', 13' of the wheels 12, 13. The vertical rotary axes 16, 17 are precisely aligned with the axles 12', 13' of the steering wheels and each is connected with a steering motor 20 and 21 for turning the steering wheels and adjusting the angle of the steering wheels.

The track width of the steering wheels 12 and 13 is designed by $t_h$, while the track width of the drive wheels 10 and 11 is designated by $t_v$, FIG. 1. The wheel base between the drive wheels 10 and 11, on the one hand, and, the steering wheels 12 and 13 on the other hand, is designated l, FIG. 2. The electrical device for controlling the drive motors 8 and 9 and the steering motors 20 and 21 are located in a box 22 on the rear side of the backrest 2.

Figure 3:
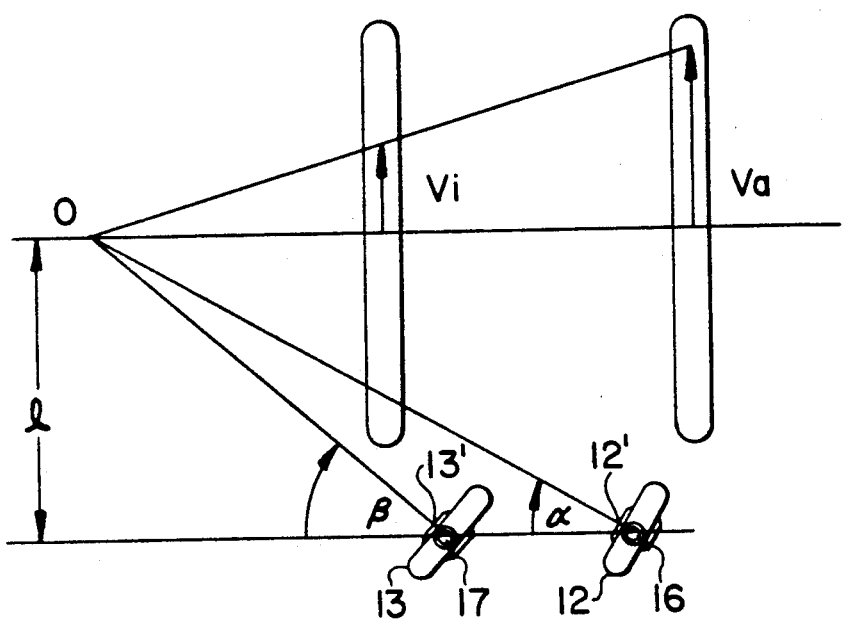
FIG. 3 is a diagram illustrating the geometry of the movement of the wheels during turning of the wheelchair.
Figure 3A:
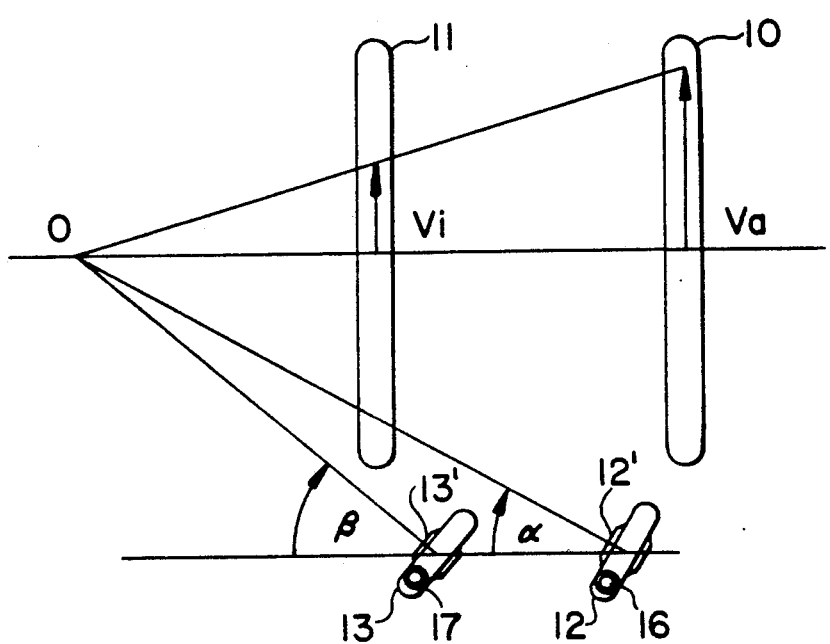
FIG. 3A is a diagram like FIG. 3 in which the vertical axis of the steering wheels lies behind the axles of the steering wheels.

FIG. 3 clarifies the geometric relationship of the wheels when travelling in curves, i.e., when the chair is turning. Both drive wheels 10 and 11 move about a central curve point 0, whereby the curve speed $v_i$ of the internal drive wheel 11 and curve speed $v_a$ of the drive wheel 10 are indicated by vectors. The steering wheels 12 and 13 and their vertical axes 16, 17 likewise move about the central point 0. The steering wheels have different steering angles (designated as $\alpha$ and $\beta$). FIG. 3A shows an alternative structure in which the steering wheels connect to vertical swivel shafts behind the axles about which the wheels rotate.

Figure 4:
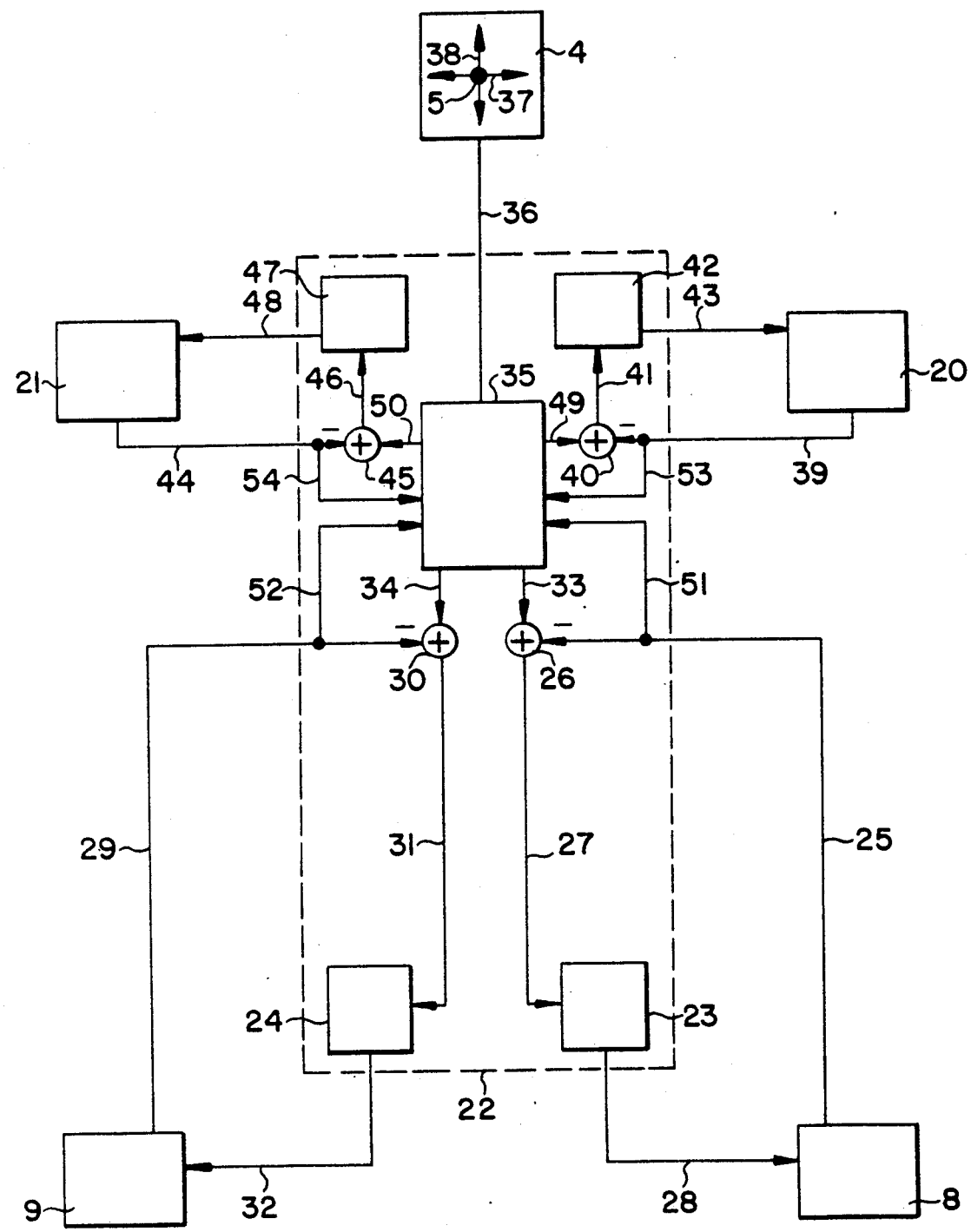
FIG. 4 is a block diagram depicting the electrical components which control the turning of the wheelchair in accordance with the invention.

FIG. 4 depicts, as a schematic wiring diagram, the electrical components of the wheelchair constructed in accordance with FIGS. 1 and 2. The drive motors 8 and 9 are each fed by means of the power electronics units 23 and 24 with which they lie in a control loop. The control loop for the drive motor 8 is formed by a line 25, an addition element 26, a line 27, the power electronics unit 23 and a line 28. The control loop for the drive motor 9 is formed by a line 29, an additional element 30, a line 31, the power electronics unit 24 and a line 32. The control loops are influenced by the additional signaling elements 26, 30 into which the control signals arrive from a microprocessor 35 via lines 33 and 34 which electrical device obtains a drive and steering signal via a line 36 from the drive switch box 4. The direction of movement of the control lever 5 is indicated by the double arrows 37 and 38. Movement in the direction of arrows 37 control the forward or reverse drive speed. Movement in the direction of arrows 38 control the steering.

The steering motors 20 and 21 are likewise arranged in control loops. The control loop for the steering motor 20 consists of a line 39, an additional signaling element 40, a line 41, a power electronics unit 42 and a line 43. The control loop for the steering motor 21 is formed by a line 44, an additional signaling element 45, a line 46, a power electronics unit 47 and a line 48. By means of a line 49, the electronic device 35 influences the addition element 40 and thus the control loop for the steering motor 20. By means of a line 50, the electronic device 35 influences the addition element 45 of the control loop for the steering motor 21. Furthermore, four lines 51-54 are provided, through which the actual values of the drive motors 8 and 9 or steering motors 20 and 21 are conveyed back into the microprocessor 35 where they are compared with the nominal values dictated by the position of the drive lever 5. Step motors or the like can also be used as steering motors, whereby the control loops can be eliminated.

The computer 35 processes the signals fed into it in accordance with the equations 1 and 2 set forth above in such a manner that the law of steering is satisfied. This means that, in each control position of the control lever 5, the speed of the drive motors 8 and 9 and the steering angles of the steering motors 20 and 21 ensure that the rotational axes both of the drive wheels 10 and 11 and the steering wheels 12 and 13 travel about a common central curve point, as is evident from FIGS. 3 and 3A.

What is claimed is:

1. In a wheelchair having at least one electrically driven drive wheel, one pair of power-steered steering wheels each of which swivels independently of each other around an essentially perpendicular steering axis, and a manually-operated control and steering element, the improvement comprising:

a separate steering motor for each steering wheel to adjust the steering angle of the steering wheels about its steering axis, said steering element comprising a mechanical-electrical steering angle generator which produces an electrical steering signal dependent on the angular position of said steering element, an electrical control device which receives said electrical steering signal, thereby controlling both said steering motors for the adjustment of the steering angle of the steering wheels by producing an adjustment signal for each steering wheel which is inversely proportional to the curve of the turning radius of each said steering wheel.

2. A wheelchair in accordance with claim 1, including a pair of drive wheels positioned preferably in front of said steering wheels in the direction of travel, a drive motor for each said drive wheel, the electrical steering signal of said steering angle generator controlling the difference in the speed of said drive wheels during turning, said electrical control device producing such adjustment signals that said steering angles satisfy the following conditions:

$$\alpha = 90° - \arctan\left(\frac{t_v \frac{i+1}{i-1} + t_h}{2 \cdot l}\right) \quad (1)$$

$$\beta = 90° - \arctan\left(\frac{t_v \frac{i+1}{i-1} - t_h}{2 \cdot l}\right) \quad (2)$$

in which:
$\alpha$ = the steering angle of the external steering wheel during turning;
$\beta$ = the steering angle of the internal steering wheel during turning;
$t_h$ = the track width of said steering wheels;
$t_v$ = the track width of said forward drive wheels;
$i = v_i/v_a$;
$v_i$ = the speed of the internal drive wheel during turning;
$v_a$ = the speed of the external drive wheel during turning; and
$l$ = the distance between the axles of the drive and steering wheels.

3. A wheelchair in accordance with claim 1 in which each said steering axis is aligned with the axles of the steering wheels.

4. A wheelchair in accordance with claim 1, in which each said steering axis lies behind the axles of said steering wheels.

* * * * *